US006996836B2

(12) United States Patent
Wright

(10) Patent No.: US 6,996,836 B2
(45) Date of Patent: Feb. 7, 2006

(54) SYSTEM AND METHOD FOR ROUTING DATA MESSAGES THROUGH A CABLE TRANSMISSION SYSTEM

(75) Inventor: Terry Wright, Norcross, GA (US)

(73) Assignee: Broadband Royalty Corporation, Wilmington, DE (US)

( * ) Notice: Subject to any disclaimer, the term of this patent is extended or adjusted under 35 U.S.C. 154(b) by 429 days.

(21) Appl. No.: 10/298,509

(22) Filed: Nov. 19, 2002

(65) Prior Publication Data

US 2003/0126618 A1 Jul. 3, 2003

Related U.S. Application Data

(63) Continuation of application No. 09/137,448, filed on Aug. 11, 1998, now Pat. No. 6,484,317, which is a continuation of application No. 08/638,280, filed on Apr. 26, 1996, now Pat. No. 5,841,468.

(51) Int. Cl.
*H04N 1/173* (2006.01)
*H04N 7/025* (2006.01)
*H04N 7/10* (2006.01)

(52) U.S. Cl. .......................... 725/32; 725/119; 725/12; 370/408; 370/389

(58) Field of Classification Search .................. 725/32, 725/119, 12, 105, 114, 116, 117, 121, 122, 725/126, 127, 131, 34; 455/5.1, 4.2; 370/400, 370/389, 401, 408, 485, 486, 487
See application file for complete search history.

(56) References Cited

U.S. PATENT DOCUMENTS

| | | | |
|---|---|---|---|
| 4,491,983 | A | 1/1985 | Pinnow et al. |
| 5,121,384 | A | 6/1992 | Ozeki et al. |
| 5,255,086 | A | 10/1993 | McMullan, Jr. et al. |
| 5,347,632 | A | 9/1994 | Filepp et al. |
| 5,351,146 | A | 9/1994 | Chan et al. |
| 5,422,631 | A | 6/1995 | Gertz |
| 5,488,412 | A | 1/1996 | Majeti et al. |
| 5,495,479 | A | 2/1996 | Galaand et al. |
| 5,512,935 | A | 4/1996 | Majeti et al. |
| 5,550,578 | A | 8/1996 | Hoarty et al. |
| 5,581,555 | A | 12/1996 | Dubberly et al. |
| 5,587,734 | A | 12/1996 | Lauder et al. |
| 5,592,477 | A | 1/1997 | Farris et al. |

(Continued)

FOREIGN PATENT DOCUMENTS

| | | |
|---|---|---|
| GB | 2263041 | 7/1993 |

(Continued)

OTHER PUBLICATIONS

"White Paper: An ATM Primer," STRATACOM, The Fast-packet Company, http://www.stratacom.com.

(Continued)

*Primary Examiner*—Vivek Srivastava
(74) *Attorney, Agent, or Firm*—Oblon, Spivak, McClelland, Maier & Neustadt, P.C.

(57) ABSTRACT

A system and method for isolating data messages received from subscribers in a CATV system are disclosed. The system includes a spectrum parallel router which receives data messages in the return spectrum of a service line at a service site. A switch at the service site directs data messages to service lines coupled to the site which have destination addresses corresponding to one of the service lines. Data messages not having a destination address corresponding to one of the service lines are provided to a transmitter for transmission to the next higher level of the CATV network over a return cable. Each service site has its own return cable which may be coupled to a distribution hub or a headend.

1 Claim, 5 Drawing Sheets

U.S. PATENT DOCUMENTS

| | | | |
|---|---|---|---|
| 5,642,155 | A | 6/1997 | Cheng |
| 5,642,351 | A | 6/1997 | Baran |
| 5,675,732 | A | 10/1997 | Majeti et al. |
| 5,721,819 | A | 2/1998 | Galles et al. |
| 5,732,216 | A | 3/1998 | Logan et al. |
| 5,745,837 | A | 4/1998 | Fuhrmann |
| 5,754,555 | A | 5/1998 | Hurme et al. |
| 5,790,541 | A | 8/1998 | Patrick et al. |
| 5,844,888 | A | 12/1998 | Markkula, Jr. et al. |
| 5,864,672 | A | 1/1999 | Bodeep et al. |
| 5,917,810 | A | 6/1999 | De Bot |
| 5,991,308 | A | 11/1999 | Fuhrmann |
| 6,065,049 | A | 5/2000 | Beser et al. |

FOREIGN PATENT DOCUMENTS

| | | |
|---|---|---|
| WO | 9527350 | 10/1995 |

OTHER PUBLICATIONS

"Test Drive ATM Before You Buy," Diagnostic and Test Equipment by Mary Jander, Data Communications Product Leader's/WAN, Reprinted from Data Communications, Feb. 1994, copyright by McGraw-Hill, Inc.

"Network Products and Support: Experience the Power of Telecommunications Technology from Newbridge," NEWBRIDGE, Copyright 1995 Newbridge Networks Corporation.

"FORE Systems ATM Network Connectivity", http://www.fore.com.

SYSTEM AND METHOD FOR ROUTING DATA MESSAGES THROUGH A CABLE TRANSMISSION SYSTEM

This application is a Continuation of application Ser. No. 09/137,448 filed on Aug. 11, 1998, which issued as U.S. Pat. No. 6,484,317 on Nov. 19, 2002, and which is a continuation of application Ser. No. 08/638,280 filed on Apr. 26, 1996, which issued as U.S. Pat. No. 5,841,468 on Nov. 24, 1998.

FIELD OF THE INVENTION

This invention relates to data communication, and more particularly, to data communication over cable television (CATV) networks.

BACKGROUND OF THE INVENTION

Cable television systems are well known. These systems are usually comprised of a headend with one or more trunk lines extending therefrom with each trunk line having a plurality of feeder lines extending therefrom into subscriber areas where each subscriber is attached via a line tap onto the feeder or service line. If the distances between the headend and subscriber areas are substantial, intervening distribution hubs may be located along the trunk lines to replenish the strength and quality of the signal being provided to subscribers. Distribution hubs simply act as small headends and exist to ensure the quality of delivered signal in large CATV networks. Each distribution hub may, in turn, be coupled to a plurality of service sites by feeder lines. Each service site may have one or more service lines extending therefrom to couple a plurality of subscribers to the service site. In this network, a transmission signal is provided over the trunk lines to the distribution hubs or service hubs. This amplified signal is then provided to the feeder lines extending from the distribution hub or service hub to provide the signal to the service sites. If the distance between a distribution hub and service site is so great as to erode signal strength to an unusable level, another distribution hub may be interposed between the service site and first distribution hub to amplify the signal strength again. Amplification occurs along trunk, feeders, and service lines as necessary to maintain the transmission signal at an adequate level before being provided to subscriber equipment. Taps located at each subscriber site bring the transmission signal into a subscriber's site.

The transmission signal from the headend may include entertainment signals and data signals. The entertainment signals may be received as broadcast signals received via satellite from a broadcast signals originating location. At the headend, each broadcast signal is placed on its own channel within the spectrum of the trunk, feeder and service lines used in the CATV system. The spectrum of the lines coupling the CATV system together is the range of frequencies supported by the communication conduits used for the lines. In a typical CATV system, this spectrum is divided into a transmission portion and a return portion. The return portion of the spectrum may be used to support data transmissions, telemetry, and/or control information from subscriber sites back to the headend. The data transmissions from subscribers typically include status information about the subscriber's equipment which may be used by components at the headend to ascertain the status of the cable system or subscriber equipment. The most common types of spectrum splitting methods are called sub-split, mid-split and high split. Sub-split means a lower portion of the spectrum smaller than the transmission spectrum is available for the return spectrum. Mid-split means that the spectrum is allocated one-half to the transmission portion and one-half to the return spectrum. High split means an upper portion of the spectrum smaller than the return spectrum is used for the transmission spectrum.

At the headend, each broadcast signal is allocated to a channel in the transmission spectrum. In a sub-split system, the first channel in the transmission spectrum begins at 55 MHz, for example. The width of the channel varies according to the standard used for the system. In the United States, most CATV systems use National Television System Committee (NTSC) standard which allocates 6 MHz to each channel. In Europe, the Phase Alteration Line (PAL) standard is used which allocates 8 MHz to each channel. The frequency of a broadcast signal may be up-shifted or down-shifted to place the broadcast signal on one of the channels of the transmission portion of the spectrum of the transmission signal provided by the headend. The data signals at the headend may be received from one or more digital data sources (including subscriber equipment) and these signals may also be placed on a channel in the transmission signal for distribution through the network. Typically, display devices such as televisions or the like at the subscriber sites use the broadcast signals to generate audio and video while data devices such as cable modems, or other intelligent devices, convert the data signals for use by computers or the like.

The trunk, feeder and service lines of many CATV systems are all coaxial cables. Because the signals carried by coaxial cables are electrical, these systems are susceptible to electrical and electromagnetic noise from natural phenomena and other electrical or magnetic sources. In an effort to improve the clarity of the signals carried over a CATV system, coaxial cables used for trunk and feeder lines are being replaced by fiber optic cables. Because fiber optic cable carries light signals, the signals are less susceptible to electrical and electromagnetic noise from other sources. Additionally, fiber optic cables carry signals for longer distances without appreciable signal strength loss than coaxial cable. However, the cost of replacing coaxial cable with fiber optic cable has prevented many companies from converting their service lines to fiber optic cable. CATV systems having both fiber optic trunk and feeder lines along with coaxial service lines are typically called hybrid fiber cable (HFC) systems. In HFC systems, the service sites where the light signal from a fiber optic cable is converted to an electrical signal for a coaxial service line is called a fiber node.

Previously known CATV systems have limitations for supporting data communication in the return spectrum of a system. In a typical sub-split CATV system, the return spectrum is in the range of approximately 5 to 42 MHz. This leaves, at best, approximately six (6) channels for data communication back to the headend using the NTSC standard and about four (4) under the PAL standard. However, not all of these channels are equally desirable for data communication. Some of the channels in this range are more susceptible to noise degradation than other channels. As a result there are few good channels for data communications in a sub-split system which is probably the most commonly used system type in the United States. In addition, standards are under development which may define channel widths for forward and return spectrum that are different than NTSC or PAL standards already established.

Even if all the channels in the sub-split range are available for data communication use, other limitations arise as the number of subscribers in the system increase. Allocating the subscribers coupled to a service line to the channels available in a return spectrum may place a reasonable number of subscribers on each channel. At the service site or fiber node, though, all of the service lines are typically merged so all subscribers coupled to the service site or fiber node are allocated to the same available channels in the return spectrum of the cable connecting the service site to the distribution hub. At the distribution hub, the data messages from each service site or fiber node coupled to the distribution hub are merged into the same spectrum of a trunk or feeder line. This merger of data messages from lower network levels to the return spectrum of a single cable continues up to the headend. In an effort to prevent all of the channel capacity being shared by a group of subscribers from being consumed, a time frequency, or other multiplex scheme may be used. While this method allocates a time slot or frequency band on a channel for a subscriber, the time or spectrum available for messages decreases as the number of subscribers decreases. For example, if a fiber node has four lines extending from it with each line having 125 customers, the 500 customers coupled to a service site or fiber node are put on six or fewer channels. At the distribution hub coupled to the fiber node, there may be, for example, three other fiber nodes coupled as well. As a result, 2000 subscribers now contend for data message space on the same six channels. In a large metropolitan area where the number of subscribers may be 200,000 or more, there may be as many as 30,000 subscribers or more per channel. Consequently, message traffic within a channel may become congested and overall performance of the messaging system degraded. Likewise, the response time for messages is significantly increased as each subscriber must contend with a large number of other subscribers for space on a channel within the return spectrum of the system.

What is needed is a way to allocate the available return spectrum in a CATV system to subscribers throughout the network without requiring all of the subscribers to contend for the same channels within the return spectrum of a cable.

SUMMARY OF THE INVENTION

The above limitations of previously known CATV systems are overcome by a system and method performed in accordance with the principles of the present invention. The system of the present invention includes a headend for generating a transmission signal having broadcast and data signals, a plurality of service sites, each service site being coupled to the headend by a transmission cable and a return cable, the transmission cable to each service sites providing the transmission signal to the service sites, a plurality of service lines extending from each of the service sites to couple a plurality of subscribers to the service sites and provide the transmission signal to the subscribers, and a spectrum parallel router in each of the service sites, each SPR being coupled to one of the service lines extending from the service site, the SPR receives data messages from the subscribers in the return spectrum of the service lines, the SPR routing data messages from one service line to another service coupled to the SPR which corresponds to a destination address in the received messages and places the received data messages on the return cable for transmission to the headend in response to the destination address in a data message not corresponding to one of the service lines coupled to the SPR so that the data messages from one service site are isolated from data messages from other service sites by the return cable.

The inventive system may also include a plurality of distribution hubs which are coupled between the headend and the service site. More than one service site may be coupled to a distribution hub, however, each service site has its own transmission line and return line to couple the service site to the distribution hub. At the distribution hub, a SPR is provided for each return line and each SPR is coupled to the transmission line for each fiber node. In response to a data message having a destination address that corresponds to one of the service sites coupled to a distribution hub, a SPR sends the data message to the SPR at the distribution hub which is coupled to that service site. For data messages having a destination address which does not correspond to a service site coupled to a distribution hub, the SPR sends the data message to the return cable coupling the SPR to the headend or next higher distribution hub. The return cable for each of the routers within a distribution hub are coupled to a corresponding router in the headend or next higher distribution hub. Data messages which an SPR receives from another SPR at the distribution hub are provided to a transmission cable coupled to the next lower level of the network. In this manner, data messages from a service site are maintained in isolation from data messages from other service sites until a data message is coupled to a transmission cable to a lower network level either at a distribution hub or the headend.

This scheme of isolating data messages from a service site as they are routed upwardly through the network to the headend or to the distribution hub where a message may be coupled to a transmission cable to a lower level, is applicable to systems where the transmission and return lines are strands of a coaxial cable or fiber optic cable. Preferably, the SPRs at the service sites also include a frequency stacker so that data messages from each service line may be provided on a separate channel of the return cable. For example, if three service lines are coupled to a service site, the frequency stacker may place all of the data messages from a first service line onto a first channel of the return cable, the data messages of the second service line onto a second data channel, and the data messages of the third service line onto a third data channel. A corresponding frequency destacker at the next higher level in the network places the data messages in the separate data channels in a common return spectrum for conversion and processing by the SPR at that level. By separating the data messages for each service line on a single return cable, isolation of the data messages for a service line is possible.

Most preferably, the SPRs of the present invention include a switch for routing data messages based on a destination address in the data messages. Each switch is an intelligent device having programmed logic which may be stored in non-volatile memory or hardwired. To route a message, the switch compares the destination address in a data message to addresses stored in an address table of the switch. If the destination address corresponds to an address in the table, the switch routes the data message to the switch at the same level corresponding to the destination address. If the address is not in the table, the SPR receives a data message from a switch at the same network level, it sends the data message to a transmission line coupled to the next lower network level. preferably, the SPR compares a source address in data messages sent by switches at the same level to a channel address table. The data message is then sent to the input of a frequency stacker corresponding to the switch which corresponds to data channel for the source address. In this manner, separation and isolation of data messages in the transmission cables of the network may also be obtained.

At the headend (or even at the distribution hub), destination addresses not corresponding to an address in the address table of a switch preferably correspond to destination addresses for other networks. Preferably, the headend or distribution hub of the present invention is provided with a gateway device which couples to other networks and routes such data messages to the other networks, including the Internet. The headend, preferably, also includes an ad server which may be used to overlay portions of broadcast and data signals in the transmission signal before it is provided to the network.

The present invention may be used in CATV systems in which the transmission cables, return cables and services lines are either all fiber optic cables or coaxial cables. In HFC systems, the invention is preferably implemented with a SPR having a group transceiver for each coaxial service line at a service site and a fiber optic transmitter and fiber optic coaxial receiver for coupling the SPR of the service site to the return cable and transmission cable to the next higher level, although other implementations are with the scope of the invention. if the service lines are also fiber optic cables, a SPR may also be used at a subscriber site to route broadcast signals to display device and data signals to data devices. Each switch of a SPR at a subscriber site may return data messages on a return cable which is a strand of the fiber optic cable not used by the other subscriber sites coupled to the service line. In this way, the data messages of subscribers may be isolated from one another. Additionally, a SPR at a subscriber site may include a frequency stacker that places data messages from different data devices at the subscriber site onto data channels of a return cable.

These and other objects and advantages of the present invention may be ascertained by reviewing the detailed specification below in conjunction with the drawings.

DETAILED DESCRIPTION OF THE INVENTION

Figure 1:
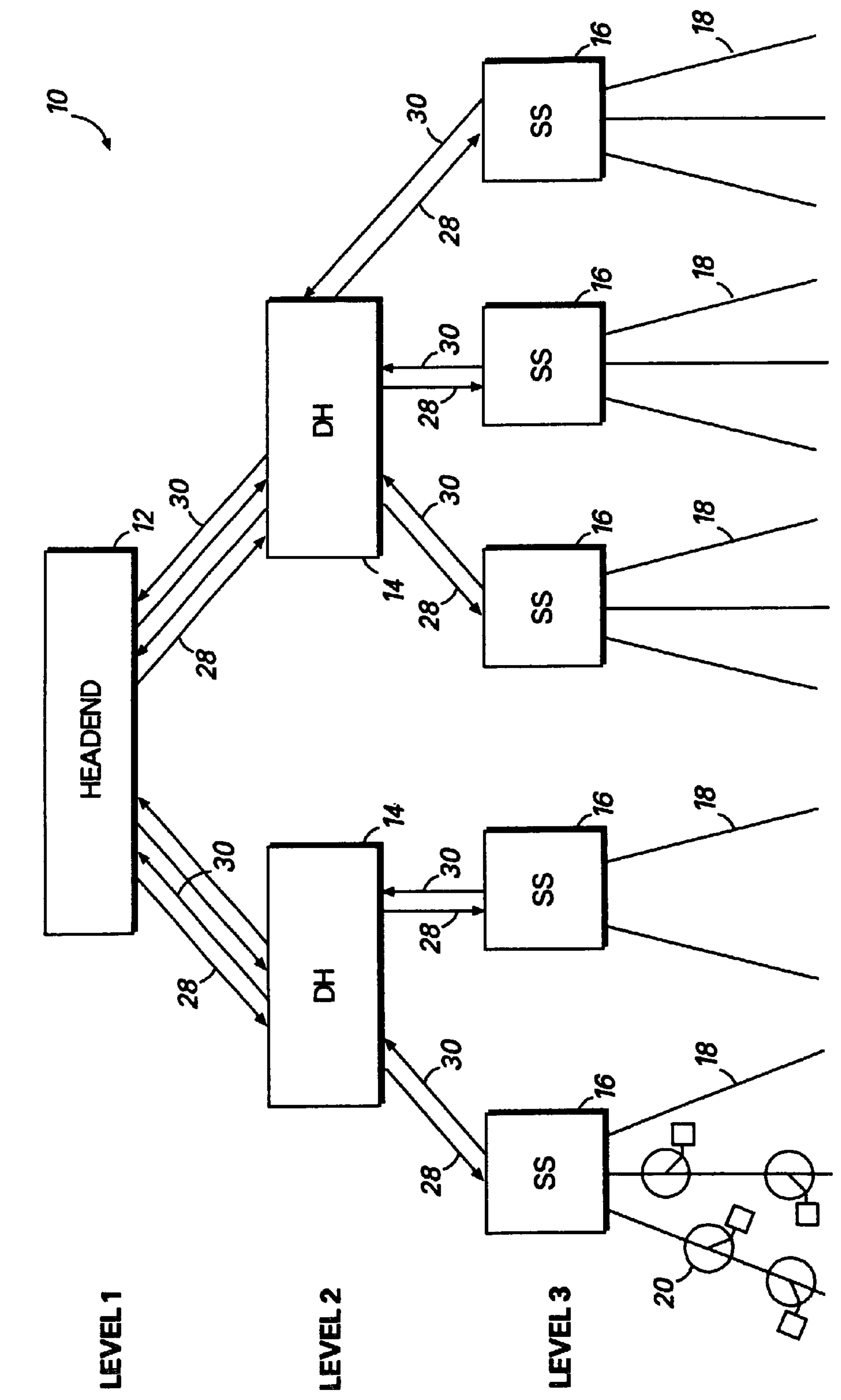
FIG. 1 is a block diagram of a CATV system utilizing the inventive routing method of the present invention.

A system made in accordance with the principles of the present invention is shown in FIG. 1. That system 10 includes a headend 12, a plurality of distribution hubs 14 and a plurality of service sites 16. Each service site 16 is coupled to one or more service lines 18 to which a plurality of subscribers are coupled through taps 20. Coupling each service site 16 to a corresponding distribution hub 14 is a transmission cable 28 and a receive cable 30. These cables and service lines 18 may all be fiber-optic cables or coaxial cables. In a HFC system transmission cables 28 and receive cables 30 are fiber optic cables while service lines 18 are coaxial cables. In this type of system, service site 16 is generally known as a fiber node. The term "fiber node" is commonly used to describe a component where signals carried by optic cables from a higher level are converted to electrical signals for coaxial cables. As used herein, the term service site includes fiber node. Each service site connected to a distribution hub has its own transmission and receive cable to couple the service site to the distribution hub. Headend 12 is coupled to each distribution hub 14 by transmission cables 28 and receive cables 30.

As shown in FIG. 1, headend 12 is the highest level of the CATV and is denoted as level 1. Distribution hubs 14 are denoted as level 2 and the service sites as level 3. FIG. 1 is merely illustrative of a system incorporating the principles of the present invention and additional levels of distribution hubs 14 may be provided between headend 12 and service sites 16, as is well known. The headend 12 of FIG. 1 generates a transmission signal having broadcast and data signals stacked in the transmission spectrum of transmission cables 28 and service lines 18, as well known. Preferably, headend 12 includes a transmission cable/receive cable pair for each service site 18 in the network. An alternative embodiment supporting data message isolation through the return cables only may use only one transmission cable 28 to couple a distribution hub to headend 12.

Figure 2A:
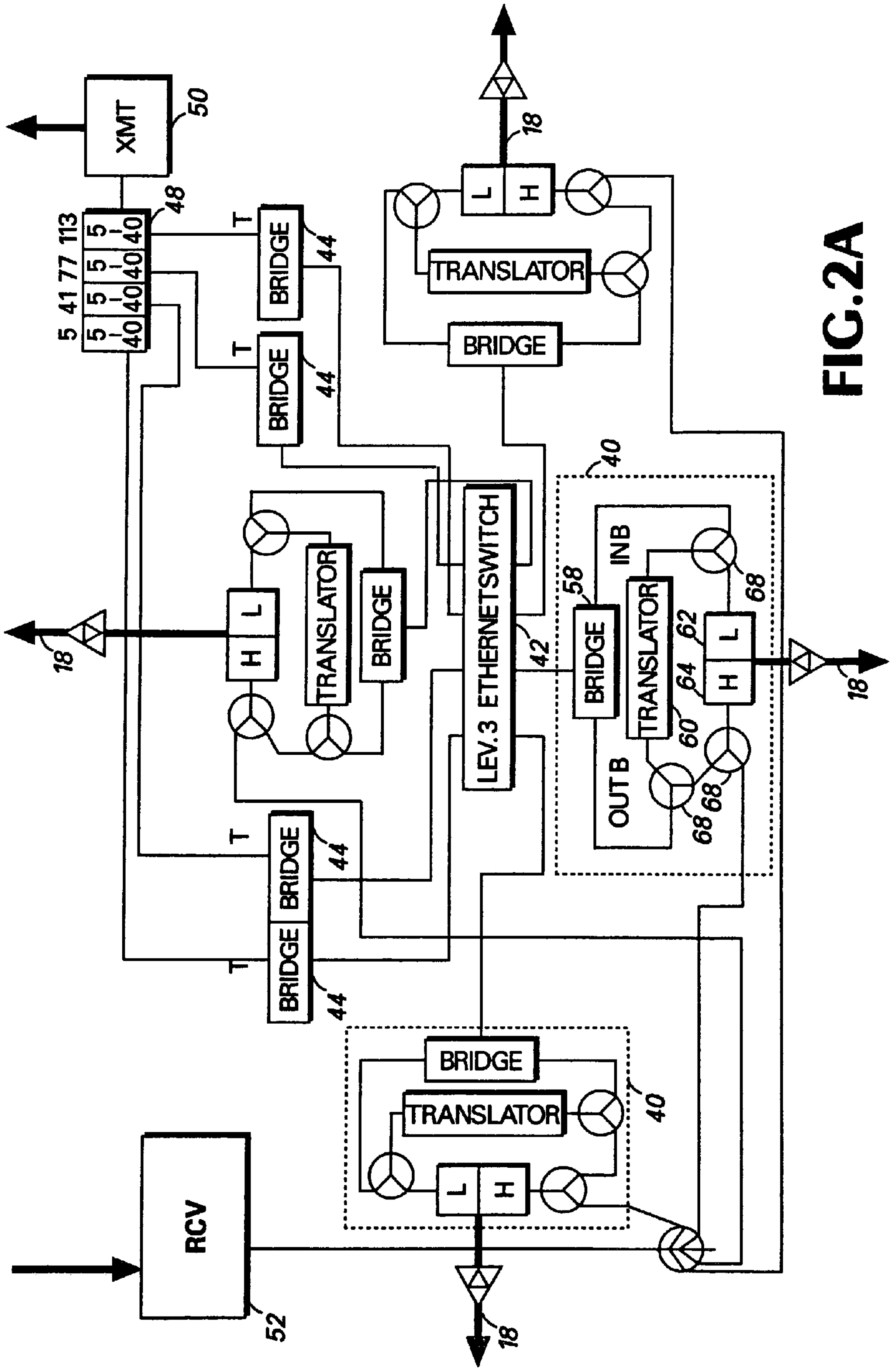
FIG. 2A is a block diagram of an alternative embodiment of the spectrum parallel router used at a service site shown in FIG. 1.

An alternative embodiment of the fiber node is shown in FIG. 2A. Each service line 18 is coupled to a group transceiver 40 which is in turn coupled to a router or switch 42. Router or switch, as used in this patent, refers to an intelligent data communication device. The intelligence may either be hardwired logic or it may be programmed logic which has been stored in non-volatile memory such as PROM or ROM. Known switches of this type include Ethernet level 3 switches, token ring 802.5 switches or FDDI or ATM switches and routers. Switch 42 is programmed to identify the destination address and source address within a data message. Techniques for identifying such addresses within a messages are well known within the art. Switch 42 also includes an address table which identifies the addresses of all subscribers coupled to a service site 18. By comparing a destination address to the addresses in the address table of a switch, switch 42 determines whether the message is to be routed to a group transceiver 40 within the service site 18. Switch 42 also includes a plurality of outputs, the number of which correspond to the number of service lines coupled to switch 42 through group transceivers 40. These outputs are coupled through bridges 44 and up-frequency stacker 48 to a transmitter 50. Each group transceiver 40 is also coupled to receiver 52 which receives the transmission signal from cable 28 and provides the transmission signal to the group transceiver for transmission over service lines 18.

Each group transceiver 40 includes a bridge 58, a translator 60, a low bandwidth receiver 62, a high frequency transmitter or diplex filter 64 and couplers 68. The components of group transceiver 40 for coupling to both fiber optic cable and coaxial cable are well known in the art. Translator 60 has its input coupled to low frequency receiver 62 through a coupler 68 and its output is coupled through a pair of couplers 68 to high frequency transmitter/filter 64. This arrangement permits data messages received on the low frequency return spectrum of a sub-split spectrum system to be up-shifted in frequency to a channel within the transmission spectrum of the transmission signal used for data messages. This signal is then provided to high frequency transmitter/filter 68 for transmission down service line 18. In this manner, data equipment at a subscriber site may verify that the message had been received by the fiber node and compute timing and other communication parameters therefrom. Bridge 58 converts digital data received from switch 42 to analog data at a frequency which corresponds to the data channel for a group transceiver within the transmission signal and it also converts analog data messages received from receiver 62 to digital data for delivery to switch 42. As stated above, switch 42 maintains address tables which identify destination addresses which are coupled to service site 16 through one of the group transceivers 40. Using these address tables, switch 42 may identify the destination address of a data message as corresponding to one of the group transceivers within service site 16. If it does, switch 42 provides the digital data to the bridge 58 of the corresponding group transceiver 40 so the message may be sent down the service line 18 to the subscriber identified by the destination address in the data message. If the destination address does not correspond to one of the addresses in the address table, switch 42 provides the data message on the output corresponding to the group transceiver 40 which sent the message and the corresponding bridge 44 coupled to that output provides an analog signal, preferably, to a frequency stacker 48. Alternatively, stacker 48 may be eliminated and all of the data signals may be placed on the same channel or frequency in the return spectrum of receive cable 30 by transmitter 50. In yet another alternative embodiment, transmitter 50 may place data messages from each group transceiver 40 on different channels within the spectrum of receive cable 30. However, the data messages from each group transceiver 40 are preferably placed in their own spectrum within the entire spectrum supported by receive cable 30. In this manner, groups of subscribers may be placed on different channels within the spectrum of receive cable 30 used for a group transceiver 40. This method of operation provides the most isolation of the data messages as they progress upwardly through network 10.

Figure 2B:
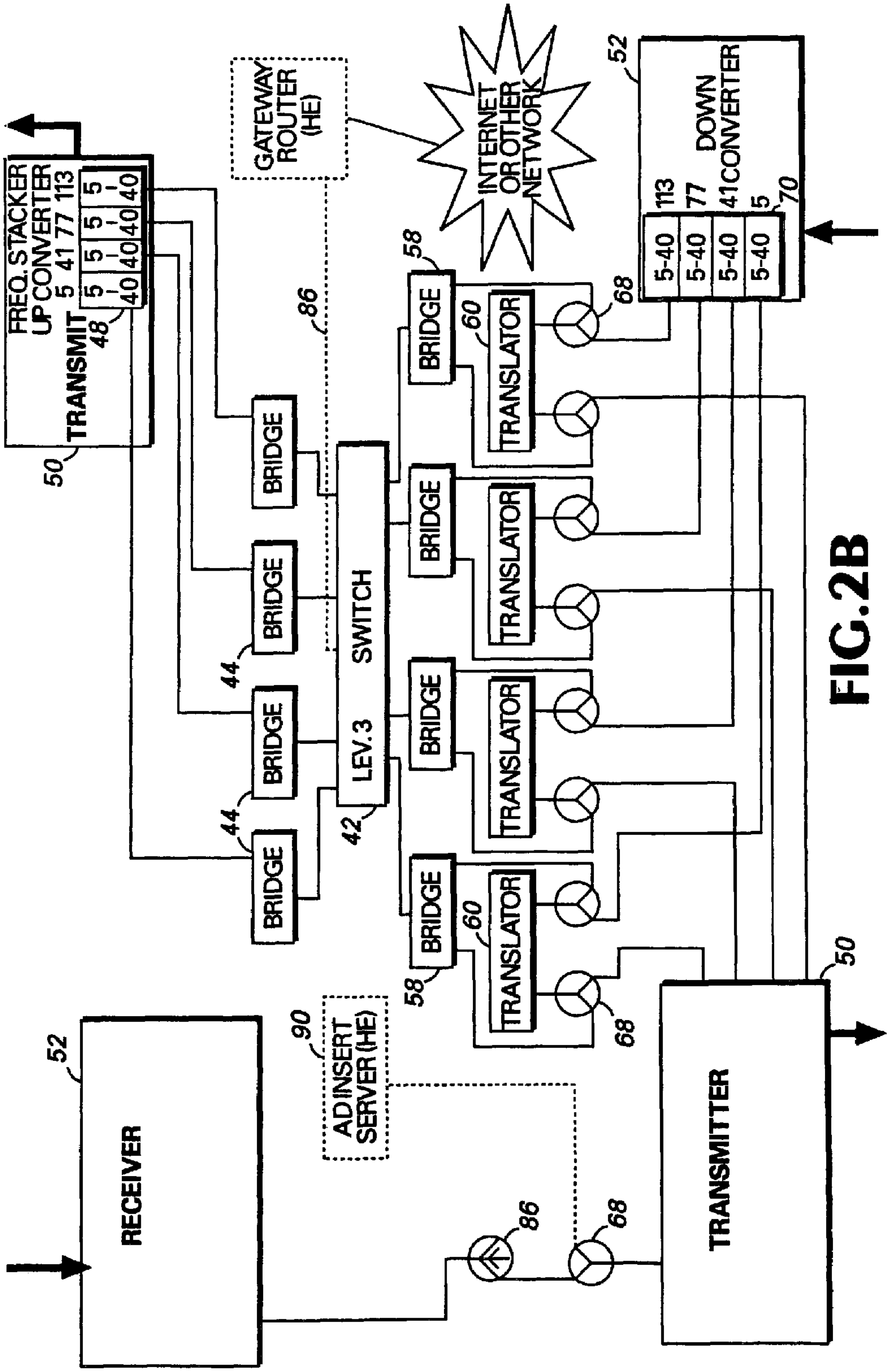
FIG. 2B is a block diagram of an alternative embodiment of the spectrum parallel router as implemented in a distribution head or headend of the system shown in FIG. 1.

An alternative embodiment of distribution hub 14 or headend 12 which operates in conjunction with the alternative embodiment of service site 16 is shown in FIG. 2B. At a distribution hub 14, a receiver 52 is provided for each fiber node or distribution hub of the next lower level coupled to the distribution hub. Receiver 52 provides analog signals from the spectrum used for data messages in receive cable 30. If the embodiment of service site 16 which stacks a spectrum for each of the group transceivers is used, distribution hub 14 has a corresponding frequency destacker 70 which places the return spectrum of each group transceiver 40 in a common spectrum range. This signal is then provided to translator 60 and bridge 58 which correspond to the frequency downshifted group transceiver channel. The translator frequency shifts the analog signal to a frequency which corresponds to a data message channel in the transmission signal and provides the data message to transmitter 50. In this manner, the data message is returned to service line 18 which originated the data message so the subscriber equipment may verify receipt of the message at the distribution hub and modify communication timing and other parameters. Bridge 58 converts the data message to digital format so switch 42 in the distribution hub may determine whether the destination address corresponds to another distribution hub or service site from the next lower level coupled to the distribution hub. If it does, the data message is routed through line 86 to another switch at the distribution hub corresponding to the destination address in the data message. The message is sent via one of the bridges 58 so it may be placed in the data message channel of the transmission signal being sent to the corresponding distribution hub or service site. If switch 42 does not identify the destination address as belonging to a distribution hub or service site coupled to the distribution node, the data message is provided through an output corresponding to the group transceiver channel to a bridge 44 which converts the data message to an analog signal which is provided to transmitter 50. Transmitter 50 may include a frequency stacker 48 for stacking the spectrums of the group transceivers processed by switch 42 or, as explained above, all of the data messages may be included in a single spectrum on receive cable 30 extending to the next higher level of the network.

The structure of headend 12 in the alternative embodiment is the same as that shown in FIG. 2B except that receiver 52 and transmitter 50 which extend to the next highest level in the network are not provided. Instead, the devices which provide the broadcast signals and data signals from external sources are provided as a transmission signal which is coupled to each transmitter 50 for transmission to the next lower level in the network. Additionally, each switch 42 at headend 12 is also coupled via line 86 to the other switches at the headend and to a gateway 74 for coupling to other networks including the Internet. Any destination address which is not recognized by a switch 42 in headend 12 as belonging to CATV network 10 is provided to gateway 74 for deliver to a destination on the corresponding other network.

As can be seen in FIGS. 2A and B and ascertained from the above-description, service site 16, distribution hubs 14, and headend 12 as implemented in accordance with the alternative embodiment of the present invention provide isolation for data messages received from each service line at a service site, at a minimum, up to the point at which the data message is coupled into the transmission signal. When frequency stackers and destackers are used to stack spectrums for data message transmissions from a lower level to a higher level and destack the spectrums at the next higher level, data message isolation may be maintained for each group transceiver as well. In this embodiment, equipment at a subscriber site monitors the data message channels in the transmission signal and, upon recognizing the destination address as its own address, retrieves the data message from the transmission signal.

Figure 3:
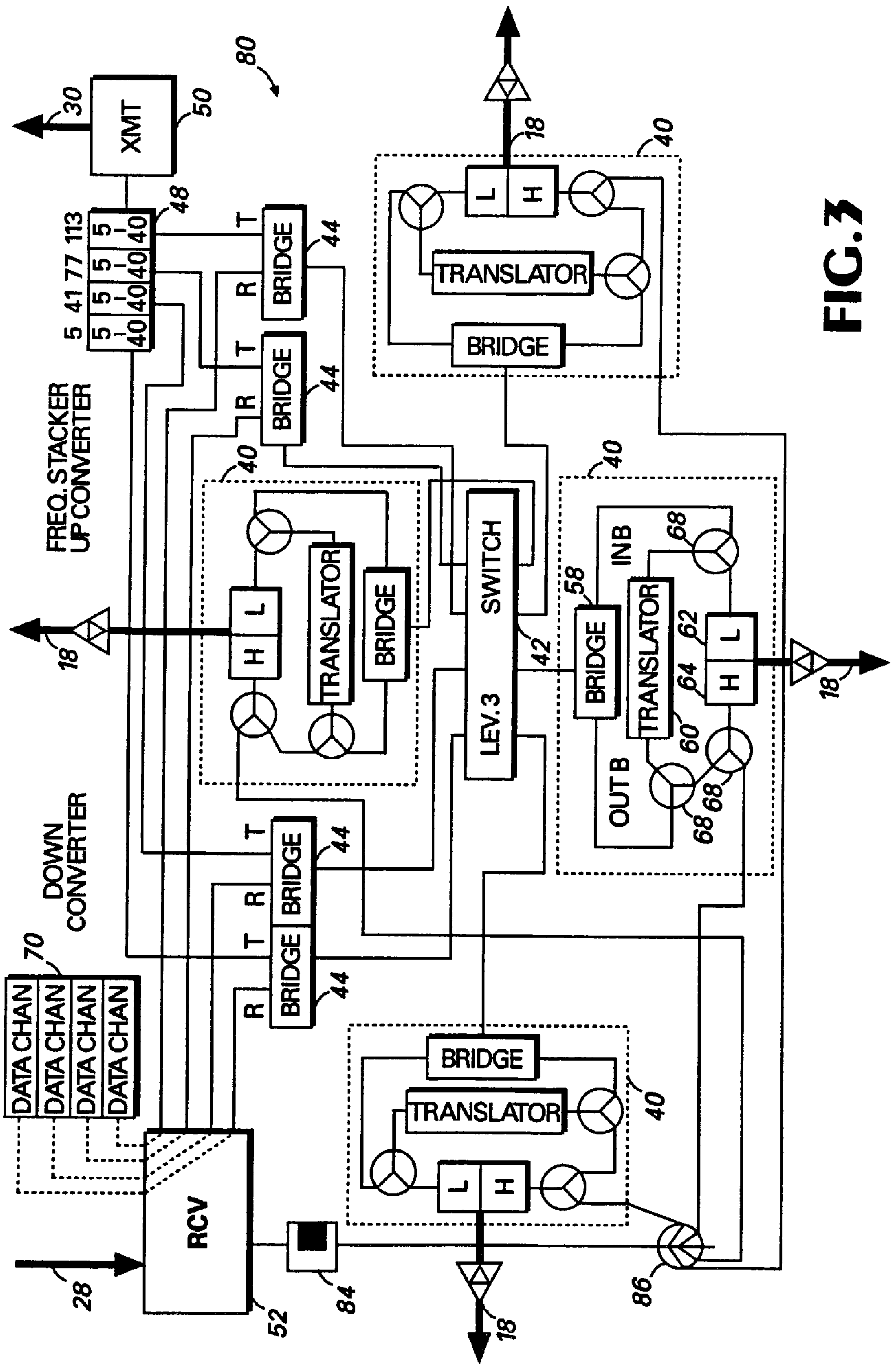
FIG. 3 is a block diagram of a preferred embodiment of the spectrum parallel router used at a service site shown in FIG. 1.

Preferably, a spectrum parallel router is used to route data message traffic in system 10. The preferred spectrum parallel router ("SPR") 80, as implemented in a service site 16, is shown in FIG. 3. The SPR 80 includes a router or switch 42 which is coupled to a plurality of group transceivers 40. The signal lines connecting group transceivers 40 and switch 42 are bi-directional. Also coupled to switch 42 is receiver 52 and transmitter 50. In an all fiber optic or HFC system, receiver 52 and transmitter 50 are fiber optic receivers and transmitters, respectively. Receiver 52 includes a frequency destacker 70 which provides data signals from a channel within the channels transmission signal on separate outputs. Preferably, each of these data channels correspond to the return spectrum used for each service line serviced by a service site. Preferably, this includes all or a portion of 37-MHz spectrum in the range 5–42 MHz for a sub-split system. The transmission signal received by receiver 52 is provided to notch filter 84 to provide the broadcast signals in the transmission spectrum to coupler 86. Coupler 86 provides the transmission signal to each group transceiver 40 in SPR 80. Each data channel is provided to a corresponding bridge 44 which in turn is coupled to switch 42. Also coupled to each bridge 44 is an input of frequency stacker 48 which corresponds to the same data channel for a group transceiver 40 within the spectrum of return cable 30 coupled to transmitter 50. Bridges 44 are controlled by switch 42 to receive data messages on a data channel from receiver 52 or to provide data messages on a data channel to its corresponding input at frequency stacker 48 for transmitter 50. Switch 42 may be any type of intelligent switching device which utilizes address information in a data message to route data messages to corresponding locations. Such a switch may be a Level 3 Ethernet switch, a token ring switch, an ATM switch, FDDI or the like. Likewise, bridges 58 are intelligent devices which monitor data messages they receive from devices lower in the network and examine the source addresses in the messages. The source addresses are added to a source address table so bridges 58 may determine whether a data message originated from a device at a lower network level coupled to the bridge. The remaining components of the SPR in FIG. 3 are well known to persons of ordinary skill in the art.

In further detail, group transceivers 40 include a bridge 58, a translator 60, a low-bandwidth receiver 62, a high frequency transmitter 64, and couplers 68. High frequency transmitter or diplex filter 64 receives the broadcast signals from coupler 86 and data messages from switch 42 and bridge 58 on the data channel corresponding to a group transceiver 40. The resulting transmission signal is provided by transmitter 64 onto service line 18 for distribution to subscribers coupled to the service line. Data messages generated by subscribers on the return spectrum of service line 18 are received by low frequency receiver 62 and are provided through coupler 68 and bridge 58 to switch 42. These messages are also provided to translator 60 which routes them through a pair of couplers back to high frequency transmitter 64 for transmission down service line 18. This return transmission of the message is to (1) permit a destination address identifying a subscriber on the service line which originated the data message to receive the data message, and (2) provide the sending subscriber with a copy of the message so the sender's equipment may calculate timing and other network communication parameters. The return signal is also provided through coupler 68 to bridge 58. Bridge 58 converts the data messages on the return spectrum received by receiver 52 to digital data messages which are provided to switch 42 for routing.

Switch 42 determines whether the destination address in each data message received from a group transceiver 40 corresponds to another group transceiver at the service site. If it does, switch 42 routes the data message to the appropriate group transceiver bridge 58 for transmission down the corresponding service line 18. If the data message does not correspond to any of the group transceivers at the service site, switch 42 sends the data message to the bridge 44 which corresponds to the data channel for the group transceiver which sent the message to switch 42. Each group transceiver 40 has a corresponding data channel so that data messages from each group transceiver may be separated from data messages from the other group transceivers. Bridge 44 converts the digital data message to an analog signal in the return spectrum of service line 18 and provides the analog signal to the input for the corresponding data channel at frequency stacker 48. The 5–42 MHz band for some of the data channels for the group transceivers are frequency up-shifted to an appropriate range in the spectrum available in receive cable 30 and provided to fiber-optic transmitter 50 for transmission to a distribution hub or headend.

Figure 4:
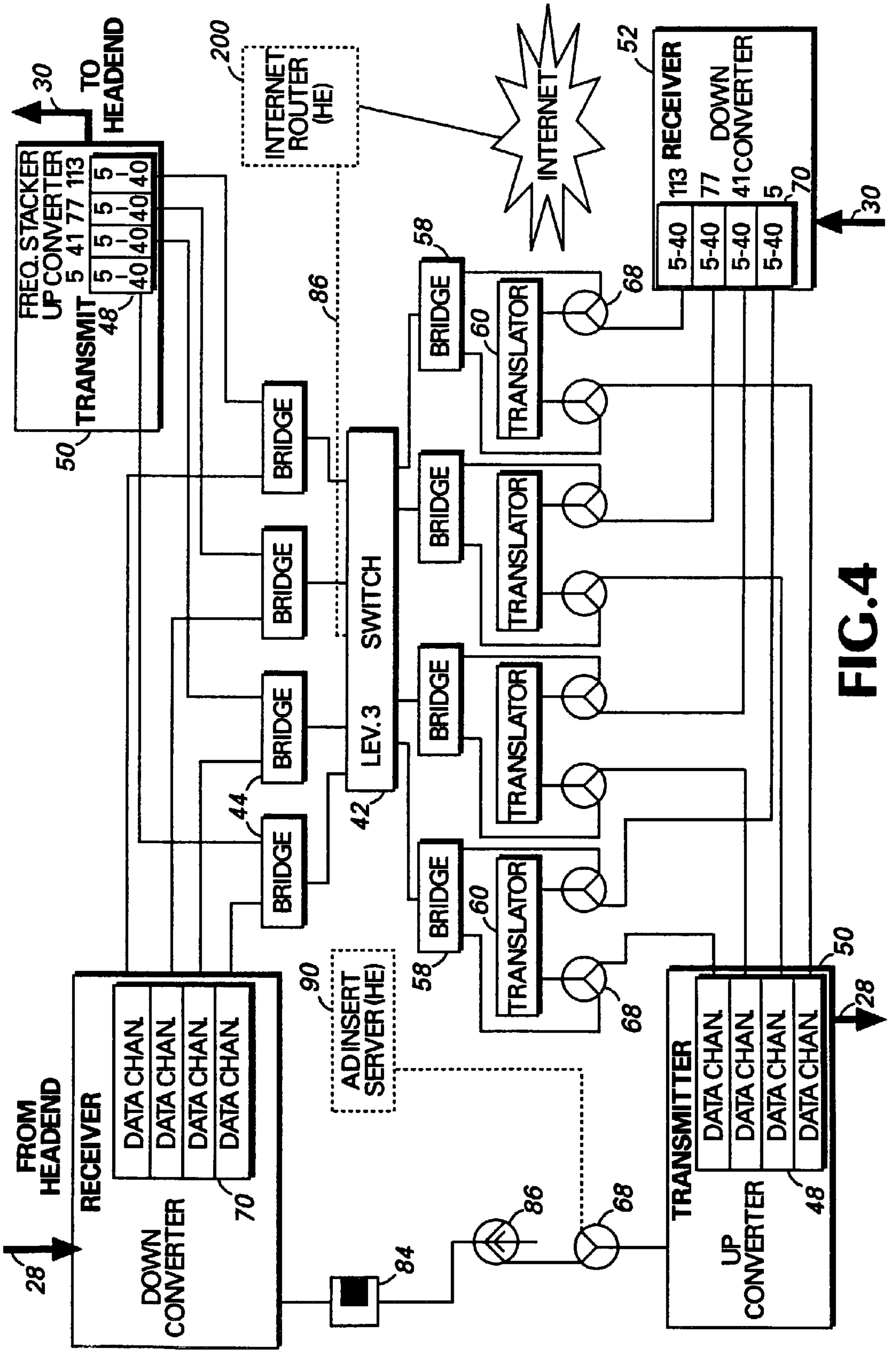
FIG. 4 is a block diagram of a preferred embodiment of the spectrum parallel router as implemented in a distribution head or headend of the system shown in FIG. 1.

A preferred SPR for a distribution head or headend is shown in FIG. 4. The transmission cable 28 to service site 16 is supplied by a transmitter 50 having an associated frequency stacker 48. The signal output by transmitter 50 directed towards the next lower network level is a transmission signal which includes the broadcast signals received by fiber receiver 52 which is coupled to headend 12 for receipt of a transmission signal. As described above, the transmission signal is provided to notch filter 84 which provides the broadcast signals to coupler 86 and to the transmitters 50 for each SPR in the distribution hub.

As previously discussed, receivers 52 also include a frequency destacker 70 which provides the data channels from the transmission signal corresponding to the group transceivers in a service site. Each data channel is provided to a bridge 58 which converts the analog signals in the data channels to digital data messages which are provided to switch 42. Coupler 68 which provides the data channels to each bridge 58 also provides the data channels to a corresponding translator 60 for delivery to the corresponding input for the data channel at frequency stacker 48. Again, this provides a copy of the data message from the distribution hub back to the subscriber's site for determination of network parameters and the like.

Switch 42 includes a connection to the switches of the other SPRs contained within the distribution hub. If switch 42 does not determine that a data message is for another SPR in the distribution hub, the data message is provided through one of the bridges 58 corresponding to the data channel on which the message was received. The data channel may be selected by comparing a source address to a source address/data channel table. The data channel in the table which corresponds to the source address in the message identifies the bridge 44 corresponding to the data channel for the group transceiver which sent the message. The bridge 58 converts the message to an analog signal and provides the signal to the corresponding input of frequency stacker 48 for transmission to the headend or next higher distribution hub. If switch 42 determines that the data message corresponds to a SPR at the distribution hub, switch 42 routes the message via line 86 to the corresponding SPR. In response to receiving such data messages, switch 42 of a SPR provides the data message through bridge 58 to the data channel input of frequency stacker 48 corresponding to the group transceiver for transmission to the destination subscriber. Transmitter 50 then transmits the data message on the data channel to the service site or distribution hub coupled to the transmitter.

At the headend, a SPR having a receiver 52 and transmitter 50 are provided for each SPR located at a distribution hub coupled to the headend. The SPRs at the headend are coupled as discussed above with respect to the SPRs in the distribution hub. Additionally, headend 12 may be coupled via line 86 to a gateway 200 which couples headend 12 to other networks including the Internet. In this embodiment, a switch in a SPR at the headend may determine that a data message does not correspond to any destination address for a subscriber within the network. In that case, switch 42 provides the data message to gateway 200 which in turn encapsulates the data message in an appropriate message protocol for routing through the other network. In a similar manner, gateway 200 may receive data messages from another network and recognize the destination address as belonging to a subscriber on network 10. Such a data message is directed to the SPR at the headend which determines the destination address coupled to the SPR. The message is then directed through the distribution hub/service site network to the corresponding subscriber. An ad insert server 90 is preferably provider at headend 12 to insert advertising and other information, which may be provided from remote sources, into the broadcast signals. Thus, the SPR of the present invention permits overlay of content within the broadcast signals generated at the headend before they are provided throughout the network.

Preferably, the SPRs of the present invention are used in a HFC network. Most preferably, the SPRs of such a network at the fiber node are coupled to the subscribers through coaxial services lines and are coupled to the next higher level of the network through fiber-optic cables. Each of the higher levels of the network are also coupled to one another through fiber-optic networks. In this manner, the reliability and clarity obtained through fiber-optic cables may be used without requiring the capital cost of replacing the coaxial service lines. In such a system, the transmitters and transceivers on each end of a transmission and receive cable are fiber-optic receivers and transmitters. Because the transmitter and router of a SPR coupled to a fiber-optic cable may each use a single strand of the cable, the present invention may be implemented in the system without requiring additional cables. The present invention may also be implemented in a system in which all of the transmission and receive cables are coaxial cables as well as the service lines. In this type of system, the receive cable for each SPR must be a separate coaxial cable and the transmission cable for each SPR in the preferred embodiment of the invention must also be a coaxial cable. While there is expense involved in providing the additional coaxial cable, such a system still provides the isolated data channels for the return spectrum communications which improve the data message traffic problems of present systems.

Another extension of the present invention is to use fiber-optic cables for service lines 18. In this type of system, SPRs may also be included at each subscriber site. The address tables for the switch in the SPR at the subscriber site may be used to direct data messages to cable modems or other data processing equipment within the home while broadcast signals are directed to display devices television or the like. Thus, the SPR of the present invention may be utilized in an all coaxial cable, all fiber-optic cable, or hybrid fiber-coaxial cable system. The present invention may also be implemented in mid-split and high-split systems to isolate data messages up to the headend, down to the service sites or in both directions.

To construct a system in accordance with the principles of the present invention, existing distribution hubs and service sites of a CATV system are provided with SPRs to route data traffic through the network. Specifically, at the fiber nodes, each service line is coupled to the SPR installed in the service sites. Thereafter, the SPR collects data messages from subscribers on the service lines and either routes them to the service line coupled to the service sites which corresponds to the destination address or transmits the data messages that are not addressed to a subscriber coupled to the service sites to the next higher level in the network. The data messages are placed in the data channel corresponding to group transceiver which received a message and transmitted to the next highest level of the network. At a distribution hub, the number of SPRs provided at the hub correspond to the number of service sites coupled to the hub. Each of the switches for the SPRs at the hub are connected to the switches of the other SPRs at the hub so that the switches may route data messages to the service site which corresponds to a destination address for a subscriber coupled to a service site which is connected to the distribution hub. For each SPR in a distribution hub, messages not having a destination address which corresponds to a service site coupled to the distribution hub are sent to a transmitter for transmission to the next level of the network. The transmitters for each SPR at the distribution hub have a corresponding SPR and receiver at the next layer of the network.

At the headend, the switch within each SPR is coupled to the switches in the other SPRs so that the switches may provide data messages having destination addresses which correspond to service sites coupled to the headend through the SPRs at the headend. If any switch at the headend cannot determine that a destination address in a message is associated with any of the SPRs at the headend, the message is provided to a gateway for distribution over another network. Likewise, the headend is preferably provided with an ad insert server which may be used to insert overlay information into the broadcast signals as they are distributed through the network. Additionally, a processor may be provided at the headend having its own unique destination address so that data messages may be received by the processor from subscribers. In this manner, the operator of the CATV system may communicate with individual subscribers.

Because the SPRs are modular in construction, the organization of distribution hubs, headers, and service sites is relatively easy to implement. Additionally, the system of the present invention permits subscribers to communicate with other subscribers through the network or other sites over the Internet or other networks without having to contend with all of the subscribers within the network for message time in the return spectrum of the same communication cables of the network. Accordingly, communication throughout the network is more reliable and faster than systems previously known.

While the present invention has been illustrated by a description of preferred and alternative embodiments and processes, and while the preferred and alternative embodiments processes have been described in considerable detail, it is not the intention of the applicants to restrict or in any way limit the scope of the appended claims to such detail. Additional advantages and modifications will readily appear to those skilled in the art.

What is claimed is:

1. A method for communicating data messages in a CATV system comprising the steps of:

receiving data messages from subscribers coupled to service lines extending from a service site in a CATV system;

routing said data messages received from a subscriber coupled to one of said service lines extending from said service site to another subscriber coupled to one of said service lines extending from said service site; and placing said data messages having a destination address not corresponding to one of said subscribers coupled to one of said service lines extending from said service site onto a spectrum of a return cable coupled to a headend of said CATV system so that said data messages for said subscribers not coupled to one of said service lines extending from said service site in a CATV system are isolated from said data messages being sent to said subscribers coupled to one of said service lines extending from said service site in said CATV system.

* * * * *

UNITED STATES PATENT AND TRADEMARK OFFICE

CERTIFICATE OF CORRECTION

PATENT NO. : 6,996,836 B2
DATED : February 7, 2006
INVENTOR(S) : Wright

It is certified that error appears in the above-identified patent and that said Letters Patent is hereby corrected as shown below:

Title page,
Items [45] and [*] should read as follows:
-- [45] **Date of Patent: *Feb. 7, 2006**
[*] Notice: Subject to any disclaimer, the term of this patent is extended or adjusted under 35 U.S.C. 154(b) by 429 days:

This patent is subject to a terminal disclaimer. --.

Signed and Sealed this

Fourth Day of April, 2006

JON W. DUDAS
*Director of the United States Patent and Trademark Office*